United States Patent [19]

Itoh

[11] Patent Number: 4,612,547

[45] Date of Patent: Sep. 16, 1986

[54] ELECTRONICALLY SCANNED ANTENNA

[75] Inventor: Shin-ichi Itoh, Tokyo, Japan

[73] Assignee: NEC Corporation, Japan

[21] Appl. No.: 529,030

[22] Filed: Sep. 2, 1983

[30] Foreign Application Priority Data

Sep. 7, 1982 [JP] Japan ................................ 57-155468
Sep. 10, 1982 [JP] Japan ................................ 57-157484

[51] Int. Cl.[4] ................................................ G01S 5/02

[52] U.S. Cl. ...................................... 343/372; 343/417

[58] Field of Search ............... 343/368, 371, 372, 373, 343/398, 408, 754, 757, 763, 824, 354, 378, 417

[56] References Cited

U.S. PATENT DOCUMENTS

| | | | |
|---|---|---|---|
| 3,176,297 | 3/1965 | Forsberg | 343/373 |
| 4,101,902 | 7/1978 | Trigon | 343/757 |
| 4,178,581 | 12/1979 | Willey, Sr. | 343/368 |

*Primary Examiner*—Theodore M. Blum

*Assistant Examiner*—David Cain

*Attorney, Agent, or Firm*—Ostrolenk, Faber, Gerb & Soffen

[57] ABSTRACT

There are provides N independent radiation opening unit adapted to form N radiation beams in a first radiation plane (N>1) and a plurality of beam control means having a power variable distribution performance and a phase control performance. The control means performs radiation beam controls including switching of the radiation beam, setting of radiation power ratio for the respective radiation beams to any desired values in the first radiation plane regarding the N radiation beams, and radiation beam scanning in a second radiation plane orthogonal to the first radiation plane in a predetermined reference direction with reference to the first radiation plane. This antenna can reduce the number of the phase shifters and eliminate a high power phase shifter.

33 Claims, 29 Drawing Figures

ELECTRONICALLY SCANNED ANTENNA

BACKGROUND OF THE INVENTION

This invention relates to an electronically scanned antenna, and more particularly to an electronically controlled antenna in which the radiation level, radiation angle, etc. of a plurality of beams in two radiation planes, orthogonal with each other, are electronically controlled.

In a typical prior art electronically scanned antenna, the antenna array is mounted on a mechanically rotating pedestal so as to scan the antenna beam in a horizontal plane at a constant speed while the beam is electronically scanned in an elevation plane. Consequently, when such an antenna is used in a radar system, the acquisition percentage of data obtained from a target is a constant value determined by the rotational speed of the antenna, and the number of hits is also a substantially constant value determined by the rotational speed therefore, it has been difficult to adaptively increase the percentage of data obtainable from the target when the antenna turns or to adaptively increase the number of hits in accordance with the nature of the input signal.

To solve these problems, an antenna has been proposed wherein the beam is electronically scanned in a solid angle of predetermined elevation angle and azimuth. Such an antenna, however, requires a square of the number of such component elements as phase shifters or the like when compared with an antenna in which the beam is electronically scanned in the elevation angle alone, whereby the construction of the antenna becomes complicated and expensive.

Another example of the prior art antenna is shown in FIG. 1 in which a plurality of antenna radiation units are mounted on a single rotary pedestal. More particularly, the antenna comprises radiation apertures 1 and 5, vertical feed circuits 2 and 6 respectively feeding the radiation apertures 1 and 5, input terminals 3 and 7 to the feed circuits 2 and 6, a high power transfer device 9 with an input terminal 10 and a rotary pedestal 11. The radiation apertures 1 and 5 form radiation beams 4 and 8, respectively.

In the antenna shown in FIG. 1, the power applied to the input terminal 10 through the rotary pedestal 11 is selectively supplied to the input terminal 3 or 7 of the feed circuit 2 or 6 by the power transfer device 9 to form antenna beam 4 or 8. In operation, subsequent to searching and measuring a specific target with the antenna beam 4, when the antenna beam 8 catches the target as the pedestal 11 rotates, the power transfer device 9 transfers the energy to the feed circuit 6 so as to search and measure the object with the antenna beam 8, thereby doubling the acquisition percentage of data regarding the object.

This type of antenna, however, requires two independent antenna radiation units so that the antenna system becomes large and expensive. Moreover, the capacity of the power transfer device should be large because it is necessary to transfer the total power of the radar.

In a prior art pulse radar system in which the position of a target is searched by receiving pulses reflected by such a flying target as an airplane and then processing the resulting position information, for the purpose of increasing the number of pulse hits (hereinafter merely termed the number of hits) obtainable from the target or acquisition percentage of data obtained under specific conditions, the radiation angle of an antenna array is electronically controlled according to a predetermined pattern in the case of a stationary antenna. But in the case of an antenna mounted on a rotary pedestal rotatable in a horizontal plane, the radiation angle of an antenna array is electronically controlled according to a predetermined pattern corresponding to the rotational movement of the antenna. In the cases of the stationary electronically controlled antenna and of the electronically controlled antenna mounted on the rotary pedestal, the number of component elements including phase shifters, etc., utilized to control the multi-radiation beams increases greatly so that the antenna becomes complicated and the cost of installation and operation increases. Moreover, the reliability of operation decreases. Where the electronically controlled antenna is mounted on the rotary pedestal, it is necessary not only to install a number of antenna arrays but also to install a high power transfer device for the feed system of the plurality of antenna arrays. This not only complicates the construction of the antenna and increases the cost of installation and operation but also decreases the reliability.

SUMMARY OF THE INVENTION

It is an object of this invention to eliminate the defects described above by using a smaller number of variable power phase shifters for the antenna feed circuit so as to form any number of desired radiation beams.

Another object of this invention is to decrease the number of component elements and eliminate a high power transfer device or switch, thus providing simple and reliable electronically scanned antenna.

Still another object of this invention is to provide a simple, economical and highly reliable electronically scanned antenna using a single array antenna on the rotating platform.

A further object of this invention is to provide an improved electronically scanned antenna capable of effecting two-dimensional scanning in a limited range, and also capable of improving the efficiency of data acquisition and eliminate azimuth ambiguity.

According to one embodiment of this invention, there is provided an electronically scanned antenna comprising N independent radiation aperture units adapted to form N radiation beams in a first radiation plane, where $N>1$, and a plurality of beam control means having a power variable distribution function and a phase control function. The control means perform radiation beam controls including switching of the radiation beams and setting of a radiation power ratio for the respective radiation beams to any desired value in the first radiation plane regarding the N radiation beams. The control means also scans the radiation beams in a second radiation plane orthogonal to the first radiation plane in a predetermined reference direction with reference to the first radiation plane in which the N radiation beams are formed.

According to a modification of this invention, there is provided an electronically scanned antenna comprising a radiation aperture unit forming N ($N>1$) multi-radiation beams in a first radiation plane, and beam control means having a power variable distribution function and a phase control function. The beam control means performs radiation beam controls including switching of the radiation beams and setting of a radiation power ratio for the respective radiation beams to any desired. The beams control means also scans the radiation beams by the radiation beams in an overlapping manner in the first radiation plane in which the multi-radiation beams are formed and scans the radiation beams in a second radiation plane orthogonal to the first radiation plane in which the multi-radiation beams are formed in a predetermined reference direction.

DESCRIPTION OF THE PREFERRED EMBODIMENTS

Figure 1:
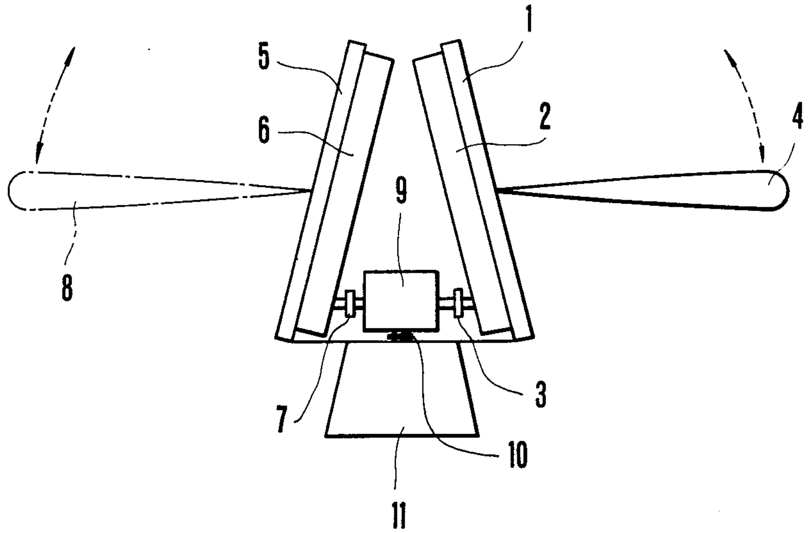
FIG. 1 PRIOR ART
FIG. 1 is a diagrammatic side view showing one example of a prior art beam switching type antenna.
Figure 2:
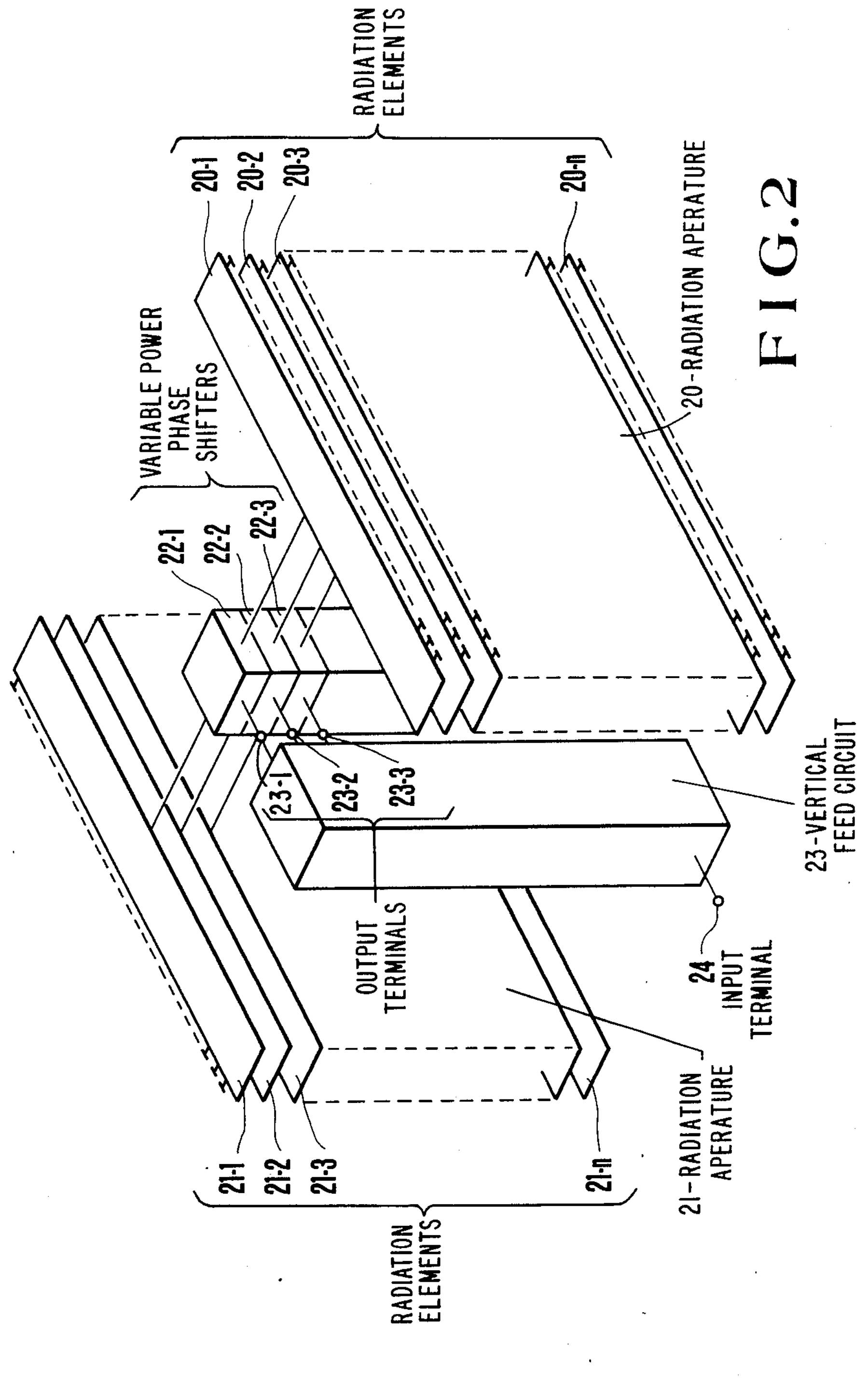
FIG. 2 is a perspective view showing one embodiment of the electronically scanned antenna radiation unit of this invention.

FIG. 2 shows an antenna radiation unit on a rotary pedestal of one embodiment of this invention having two radiation aperture units. Thus, the radiation unit shown in FIG. 2 comprises a first radiation aperture 20 made up of n radiation elements 20-1 through 20-n, a second radiation aperture 21 made up of n radiation elements 21-1 through 21-n, n variable power phase shifters 22-1 to 22-n, and a vertical feed circuit 23 having n output terminals 23-1 to 23-n, and an input terminal 24. The operation of this invention will be described on the assumption that the antenna is in the transmitting state. The radio frequency power supplied to the antenna radiation unit through the mechanical rotary pedestal is inputted to the input terminal 24 of the vertical feed circuit 23. The radio frequency power is distributed by the vertical feed circuit 23 over the antenna vertical apertures after adjusting such that a predetermined amplitude/phase distribution is established over these apertures, and then supplied as n input power waveforms to n output terminals 23-1 to 23-n.

Then the radio frequency power is supplied to corresponding vertically aligned radiation elements via two-output variable power phase shifters. More particularly, taking an i-th element as an example, the input power waveform from an output terminal 23-i of the vertical feed circuit 23 is supplied to a two-output power phase shifter 22-i and its output power waveform are supplied to a radiation element 20-i of the radiation aperture 20 and to a radiation element 21-i of the radiation aperture 21.

Figure 3A:
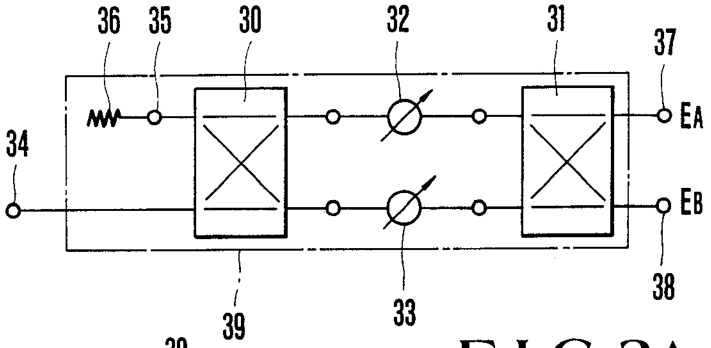
FIGS. 3A to 3D are connection diagrams showing some examples of the variable power phase shifters utilized in this invention.

FIG. 3A shows one example of a one-input/two-output variable power phase shifter. It comprises a 180° hybrid coupler 30, two electronically controlled phase shifters 32 and 33, a 90° hybrid coupler 31, an input terminal 34, two output terminals 37 and 38, an error terminal 35 and a terminal resistance 36. The power inputted to the input terminal 34 is evenly as two partial power waveforms to the two phase shifters 32 and 33 via 180° hybrid coupler 30 and then synthesized by the 90° hybrid coupler 31. The synthesized power is supplied to a matched load as a voltage $E_A$ at the output terminal 37 and as a voltage $E_B$ at the output terminal 38. These output voltages $E_A$ and $E_B$ are respectively expressed by the following equations;

$$E_A = E_o \cos\left(\frac{\phi_2 - \phi_1}{2} - \frac{\pi}{4}\right) e^{-j\left(\frac{\phi_1+\phi_2}{2} + \frac{3}{4}\pi\right)} \quad (1)$$

$$E_B = E_o \sin\left(\frac{\phi_2 - \phi_1}{2} - \frac{\pi}{4}\right) e^{-j\left(\frac{\phi_1+\phi_2}{2} + \frac{3}{4}\pi\right)} \quad (2)$$

in which $\phi_1$ and $\phi_2$ respectively represent phase delays given by phase shifters 32 and 33, and $E_O$ represents an input amplitude.

Consequently, the power ratio at the output terminals 37 and 38 is determined only by the set phase difference $(\phi_2-\phi_1)$ and the phases of respective voltages are determined only by the sum $(\phi_1+\phi_2)$ of the set phases.

Figure 4:
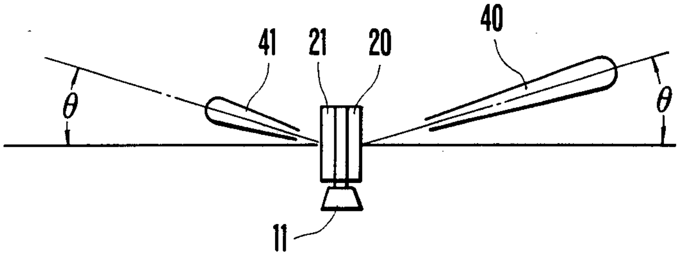
FIG. 4 shows one example of forming beams by the antenna of this invention.

By the above-described operation of the variable power phase shifter, it is possible to set the phase shift difference $\Delta\phi=\phi_2-\phi_1$ of all variable power phase shifters 22-1 to 22-n to a value corresponding to a desired power ratio $P_1/P_2$ wherein $P_1$ represents the power supplied to the radiation aperture 20 and $P_2$ the power supplied to the radiation aperture 21. Furthermore, by setting the sum of the phase shifts of respective phase shifters, $\Sigma\phi=\phi_1+\phi_2$, to a value corresponding to a desired beam elevation angle $\theta$ according to the theory of phased arrays, the set value of phase shift of any phase shifter among respective variable power phase shifters 22-1 to 22-n can be definitely determined as $\phi_1=(\Sigma\phi-\Delta\phi)/2$, and $\phi_2=(\Sigma\phi+\Delta\phi)/2$. Consequently, when the predetermined amounts of phase shifts are set for respective phase shifters and the directional gains of the radiation apertures 20 and 21 are denoted by $G_1$ and $G_2$, respectively, it is possible to form antenna beams 40 (effective radiation power $P_1G_1$) and 41 (effective radiation power $P_2G_2$) having a predetermined power ratio and being in a predetermined elevation angle $\theta$ as shown in FIG. 4. Where the radar is operated by forming a plurality of beams in a horizontal plane, the acquisition percentage of data can be improved if suitable means for eliminating the ambiguity of the azimuth angle is used as will be described later.

When the phase sum $\Sigma\phi=\phi_1+\phi_2$ is varied in accordance with a desired beam elevation angle while maintaining the phase difference $\Delta\phi=\phi_2-\phi_1$ at a constant value, it becomes possible to scan or displace the beam in a vertical plane without changing the power ratio of the two beams.

Figures 5A, 5B:
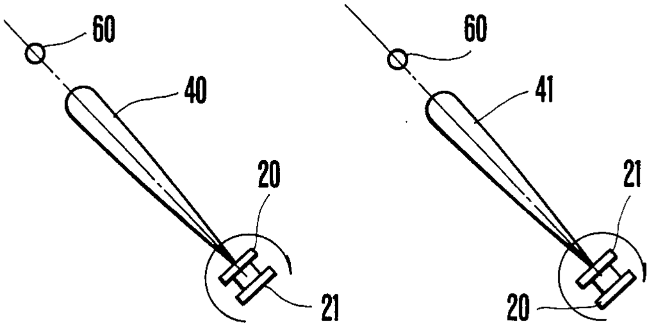
FIGS. 5A and 5B show the operation of a beam switching type radar utilizing the antenna of this invention.

Also, when the phase difference $\Delta\phi=\phi_2-\phi_1$ is set to $\pi/2$, all power appears at the output terminal 37 shown in FIG. 3A whereas when the phase differences $\Delta\phi=\phi_2-\phi_1$ is set to $3\pi/2$, the relation to the output power becomes just opposite to that of a case wherein $\Delta\phi=\pi/2$, whereby all power appears at the output terminal 38. Suppose now that the output terminal 37 is connected to the radiation aperture 20 and that the output terminal 38 is connected to the radiation aperture 21. Then, as the phase difference set value $\Delta\phi=\phi_2-\phi_1$ of the variable power phase shifters 22-1 to 22-n is changed from $\pi/2$ to $3\pi/2$, the antenna beam would be instantly switched from the radiation aperture 20 to the radiation aperture 21. Consequently, when it becomes necessary to improve the data rate regarding specific radar target 60, a beam 40 is formed by only the radiation aperture 20 as shown in FIG. 5A and a beam 41 (see FIG. 5B) is formed by setting the phase difference $\Delta\phi=\phi_2-\phi_1$ to $3\pi/2$, at an instant when the beam 41 formed by feeding power to the radiation aperture 21 in the course of the rotation of the antenna is directed to the radar target 60, so as to scan the target twice during one revolution of the antenna, thus improving the data rates.

Figure 6:
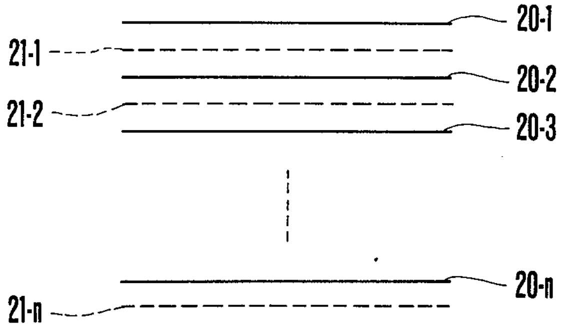
FIG. 6 is a diagrammatic representation showing the arrangement of the radiation elements of the antenna embodying the invention.
Figure 7:
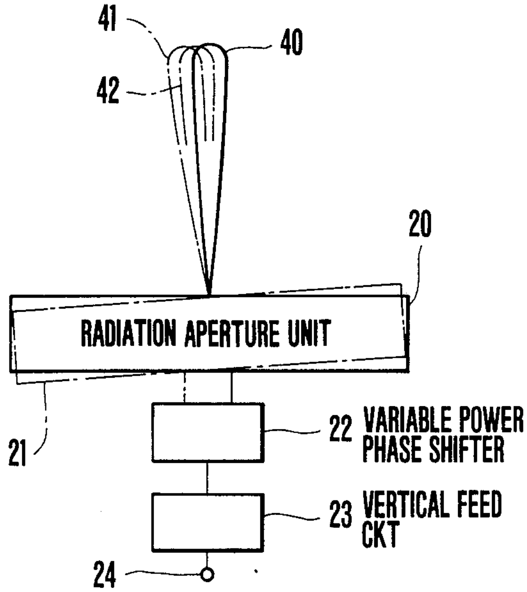
FIG. 7 is a connection diagram showing one example of forming a beam with the antenna shown in FIG. 6.

A second embodiment of this invention in which two antenna arrays are interlocked interdigitally will now be described with reference to FIGS. 6 and 7. FIG. 6 is a front view of the two antenna radiation arrays, in which 20-1 to 20-n represent element antennas constituting the radiation aperture unit 20, while 21-1 to 21-n represent element antennas constituting the radiation aperture unit 21 showing that the radiation apertures of the two arrays are interlocked interdigitally on substantially the same aperture plane. FIG. 7 is a top plan view of the antenna shown in FIG. 6 showing that the two antenna radiation aperture units 20 and 21 are formed on substantially the same aperture plane and that beams 40 and 41 corresponding to respective radiation units overlap with each other on the same horizontal plane with a spacing substantially equal to the beam width. In the same manner as the first embodiment, the operation of this modification will be described on the assumption that the antenna is in the transmitting state.

The power supplied to the input terminal 24 of the vertical feed circuit 23 is distributed among the input terminals of the two-output variable power phase shifters 22 of the same number as that of the radiation elements on the vertical aperture, and then supplied to the two antenna radiation aperture units 20 and 21 at a predetermined phase shift and at a power distribution ratio effected by respective variable power phase shifters. In FIG. 7, the power supplied to the antenna radiation aperture unit 20 forms a beam 40 whereas the power supplied to the antenna radiation aperture unit 21 forms a beam 41. Where, in this antenna system, two-output variable power shifter 22 of the type shown in FIG. 3A is used as in the first embodiment, the electronic beam scanning in the vertical plane can be controlled by controlling the sum of the phase shifts $\Sigma\phi=\phi_1+\phi_2$ of the two-output variable output power phase shifter, and the two beams 40 and 41 can be formed at any power ratio by controlling the phase difference $\Delta\phi=\phi_2-\phi_1$.

Figure 8A:
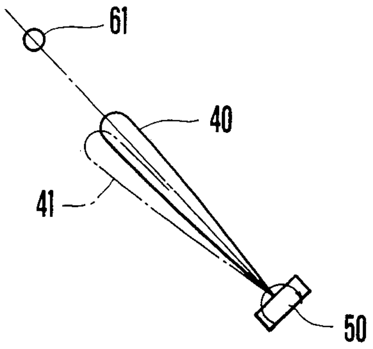
FIGS. 8A and 8B show one example of the beam scanning with the antenna of this invention.
Figure 8B:
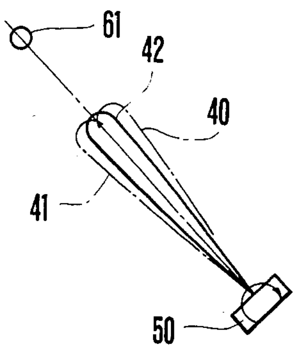

As a consequence, the two beams synthesized by the variable power phase shifter 22 are synthesized into a single beam 42 directed in a predetermined direction between the directions of beams 40 and 41 in accordance with the power ratio, whereby the beam can be scanned at fine steps by controlling the phase difference in the two-output variable power phase shifter. Accordingly, when it is necessary to increase the number of hits regarding a specific target with a radar utilizing an antenna 50 rotating in the horizontal plane as shown in FIGS. 8A and 8B, the number of hits can be increased by irradiating a specific target 61 with beam 40 as shown in FIG. 8A and then by electronically scanning the beam in the opposite direction form that of the rotation of the antenna as shown in FIG. 8B to form a beam 42 in a predetermined direction, thereby increasing the irradiation time and consequently the number of hits.

In the example shown in FIG. 7 the radiation aperture units 20 and 21 are slightly displaced from each other in the horizontal plane. But even when the orientations of the radiation apertures match perfectly, the same operation as that shown in FIG. 7 can be obtained by displacing the directions of the beams by means of the horizontal feed circuit.

Figure 3B:
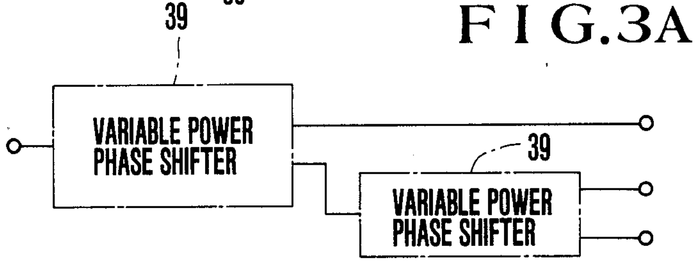
Figure 3C:
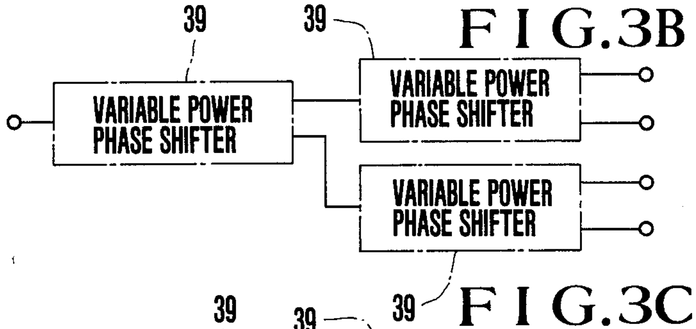
Figure 3D:
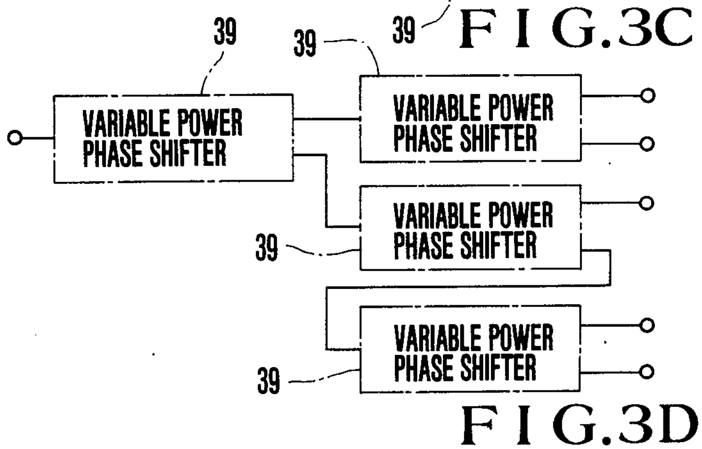

In the first and second embodiments, even when more than two antenna radiation arrays are provided, the same operation can be ensured. In this case, as shown in FIGS. 3B to 3D, a one-input/N-output variable power phase shifter may be constituted by combining (N−1) two-output power phase shifters 39 shown in FIG. 3A in series and parallel fashion and by adjusting the phase shift angles $\phi_1$ and $\phi_2$ obtained from phase shifters included in each two-output variable power phase shifter so as to distribute the power inputted to the input terminal to corresponding N outputs thereby controlling the amplitudes and phase shifts of these outputs.

Figure 9:
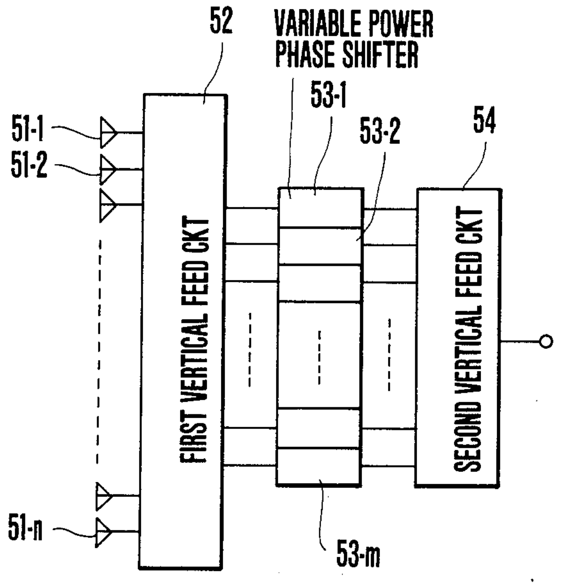
FIG. 9 is a side view showing another construction of the antenna of this invention.

Although the number in the foregoing embodiment of variable power phase shifters is the same as that of the vertical elements of respective radiation aperture units, the same operation can be obtained by providing a first vertical feed circuit 52 between the element antennas 51-1 to 51-n of the radiation unit and the variable power phase shifters 53-1 to 53-m, as shown in FIG. 9. This does not change the antenna aperture, but the number of antenna elements as viewed from the feeder is equivalently decreased to m ($m<n$). The input terminal is connected through a second vertical feed circuit 54 to the m variable power phase shifters 53-1 to 53-m as shown in FIG. 9. The principle of the equivalent reduction of the number of antenna elements applicable to the first vertical feed circuit 52 is disclosed in, for example, Japanese Preliminary Patent Publication No. 11748/'77.

Instead of mounting the antenna of this invention on the rotary pedestal, the antenna may be fixed, and furthermore the first and second radiation planes may be exchanged so as to obtain an efficient system depending on the operational situation.

As described above, according to this invention, a plurality of variable power phase shifters are provided between respective element antennas and a vertical feed circuit so that adaption of the beam formation for antenna operation can be improved and the number of component, including variable power phase shifters for controlling the radiation beams, can be reduced greatly. Furthermore, it is possible to eliminate a high power transfer device.

Figure 10A:
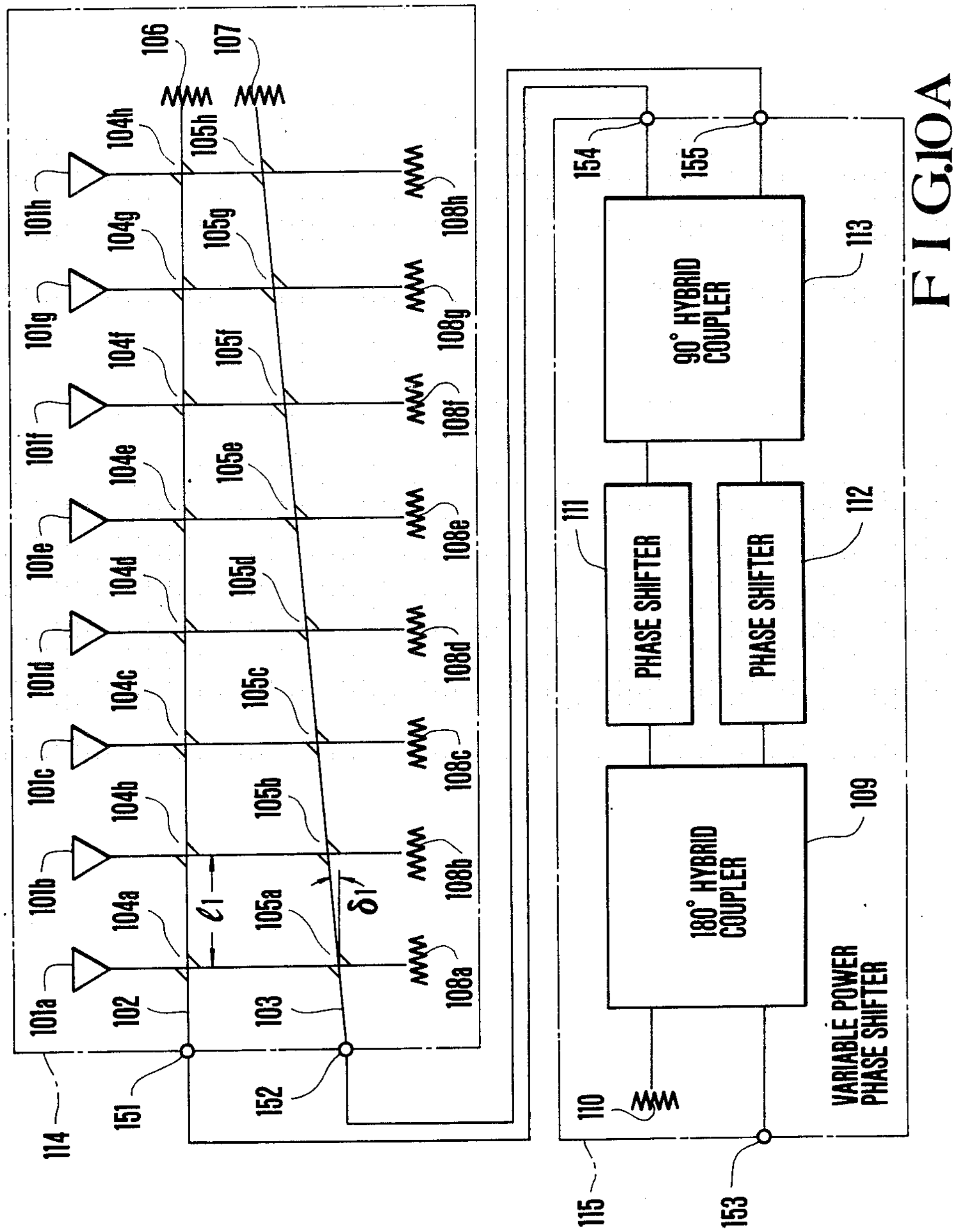
FIGS. 10A, 10B, 11A and, 11B are block diagrams showing further embodiments of the invention.
Figure 10B:
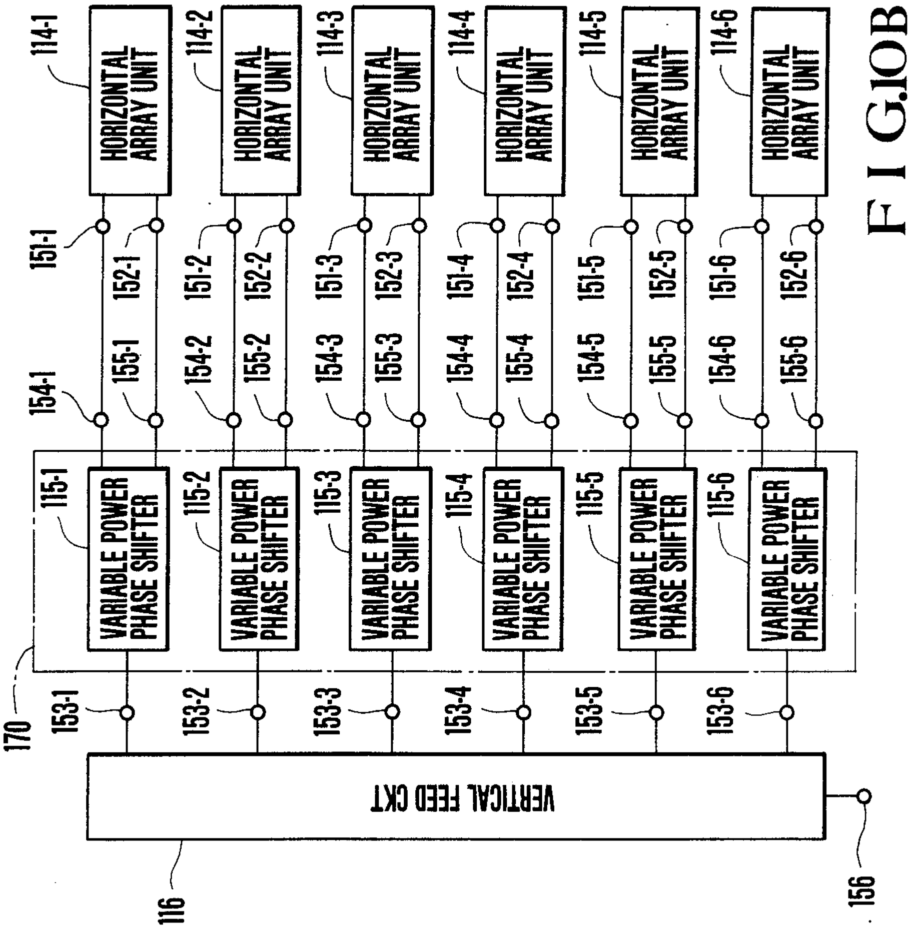

FIGS. 10A and 10B show another embodiment of this invention in which first and second radiation planes are horizontal and vertical planes respectively and the number of multi-radiation beams is two. FIG. 10A is a block diagram for explaining radiation beam characteristics of an electronically scanned antenna including a horizontal array unit and a two-output variable power phase shifter with a pair of output terminals. This embodiment corresponding to an electronically scanned antenna in which two multi-radiation beams are formed in the horizontal plane and the array radiation aperture is formed by arranging, in the vertical direction, 6 horizontal array units each including 8 radiation elements arrayed in the horizontal direction. More particularly, as shown in FIG. 10B, this embodiment comprises horizontal array units 114-1 to 114-6, beam control means 170 including two-output variable power phase shifters 115-1 to 115-6 and a vertical feed circuit 116.

In FIG. 10A, a transmission pulse signal inputted to a terminal 153 is divided into two portions by a 180° hybrid coupler 109 and a non-reflective terminal 110 included in a variable power phase shifter 115, then phase-shifted by variable phase shifters 111 and 112, and inputted to a 90° hybrid coupler 113. The outputs of the 90° hybrid coupler 113 are supplied to transmission lines 102 and 103 respectively via terminals 154, 151 and terminals 155, 152. Denoting the signal voltage inputted to terminal 153 by $E_O$, and the phase angles (delay) of the phase shifters 111 and 112 by $\phi_1$ and $\phi_2$, respectively, signal voltages $E_A$ and $E_B$ outputted from the terminals 154 and 155 of the two-output variable power phase shifter 115 are expressed by equations (1) and (2) described previously.

Accordingly, the amplitude ratio or power ratio of the signals outputted from terminals 154 and 155 is determined only by the difference ($\phi_1-\phi_2$) of the set phase angles of the phase shifters 111 and 112, while the phase of the output signal is determined only by the sum ($\phi_1+\phi_2$) of the set phase angles $\phi_1$ and $\phi_2$. Examples of the constructions of the variable power phase shifter having 2,3,4 and 5 outputs are shown in FIGS. 3A to 3D, respectively.

In FIG. 10A, signal power inputted to the signal transmission line 102 via terminal 151 from the terminal 154 of the variable power phase shifter 115 is fed to radiation elements 101*a* to 101*h* via directional couplers 104*a* to 104*h* provided on the transmission line 102 at a predetermined spacing of $l_1$. The degrees of coupling of the directional couplers 104*a* to 104*h* are adjusted to form a predetermined coupling distribution for the purpose of making an adequate radiation aperture distribution for beam formation by radiation elements 101*a* to 101*h*. Signal power remaining after the supply of power to the radiation elements 101*a* to 101*h* through directional couplers 104*a* to 104*h* is absorbed by non-reflective terminal 106 so as to prevent unwanted radiation beams. On the other hand, signal power supplied to the transmission line 103 via terminal 152 from the terminal 155 of the variable power phase shifter 115 is fed to the radiation elements 101*a* to 101*h* via directional couplers 105*a* to 105*h* provided on the transmission line 103 at a predetermined spacing. Suppose now that the transmission lines directly connected to the radiation elements 101*a* to 101*h* are arranged at right angles with respect to the transmission line 102, that they are arranged at an angle which is different from 90° by $\delta_1$ radians with respect to the transmission line 103, that the spacing of radiation elements is equal to $l_1$, and that the transmission wavelength of transmission lines 102 and 103 is $\lambda_p$, the directive angles of the radiation beams $\theta_1$ and $\theta_2$ of the horizontal array unit 114 corresponding to the transmission lines 102 and 103 are expressed by the following equations, respectively:

$$\theta_1 = \sin^{-1}\left\{ \lambda\left( \frac{1}{\lambda_P} - \frac{k}{l_1} \right) \right\} \quad (3)$$

$$\theta_2 = \sin^{-1}\left[ \lambda\left\{ \frac{1}{\lambda_P}\left( \frac{1 - \sin\delta_1}{\cos\delta_1} \right) - \frac{k}{l_1} \right\} \right] \quad (4)$$

in which $\lambda$ represents the free space wavelength and k a positive integer. Consequently, by adjusting the value of $\delta_1$ in FIG. 10A, the horizontal array unit 114 forms radiation beams at two arbitrary azimuth angles $\theta_1$ and $\theta_2$. A non-reflective terminal 107 for the transmission line 103 is used for the same purpose as the non-reflective terminal 106. Non-reflective terminals 108*a* to 108*h* are provided for the transmission lines directly connected to the radiation elements 101*a* to 101*h* for the same purpose as the non-reflective terminals 106 and 107.

FIG. 10B shows the connection in which 6 sets of the horizontal array unit 114 and variable power phase shifter 115 are arranged vertically.

Figure 12A:
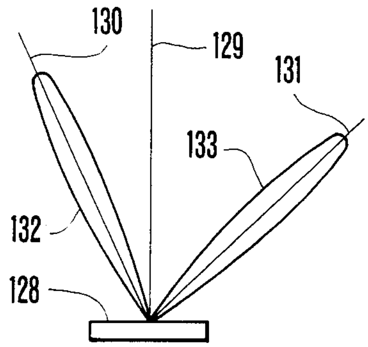
FIGS. 12A, 12B and 12C and FIGS. 13A, 13B and 13C show beam control characteristics of two radiation beams.
Figure 12B:
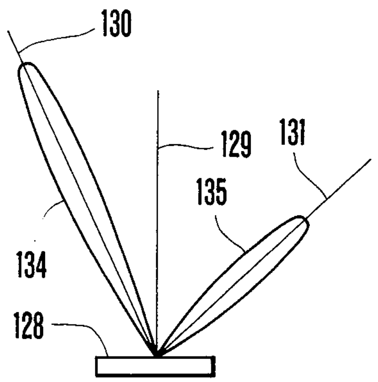
Figure 12C:
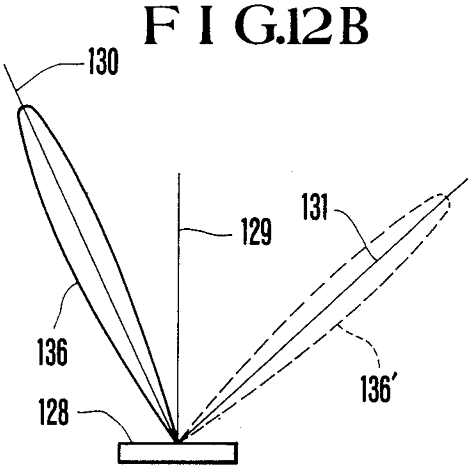

In FIG. 10B, horizontal array units 114-1 to 114-6 are connected to corresponding variable power phase shifters 115-1 to 115-6 respectively, while the variable power phase shifters 115-1 to 115-6 are connected to a vertical feed circuit 116. The transmission operation will first be described. An input signal inputted to a terminal 156 is distributed into 6 signals having predetermined amplitudes and phases by the vertical feed circuit 116 and the 6 signals are fed respectively to variable power phase shifters 115-1 to 115-6. In these variable power phase shifters, when the difference ($\phi_1-\phi_2$) of the phase angles $\phi_1$ and $\phi_2$ of the variable phase shifters 111 and 112 is varied while maintaining a constant phase sum ($\phi_1+\phi_2$), the radiation beams radiated from the horizontal array units 114-1 to 114-6 fed via the variable power phase shifters 115-1 to 115-6 are directed at the azimuth angles $\theta_1$ and $\theta_2$ described above and the radiation level varies between zero and the maximum value when the phase difference ($\phi_1-\phi_2$) varies. The formation of the two radiation beams in the horizontal radiation plane is shown in FIGS. 12A to 12C. Thus, two radiation beams are formed in two directions 130 and 131 with respect to the front direction of the radiation aperture unit 128 formed by the horizontal array units 114-1 to 114-6 shown in FIG. 10B. FIGS. 12A, 12B and 12C show examples in which by the setting of the difference ($\phi_1-\phi_2$), both beams are made to have equal levels (FIG. 12A), the level of one beam is made larger than that of the other (FIG. 12B), and only one beam is formed (FIG. 12C). Of course, when the difference ($\phi_1-\phi_2$) is properly set, it is possible to produce a radiation beam 136' in the direction 131 as shown by dotted lines.

Figure 13A:
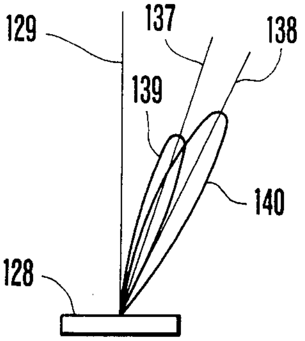
Figure 13B:
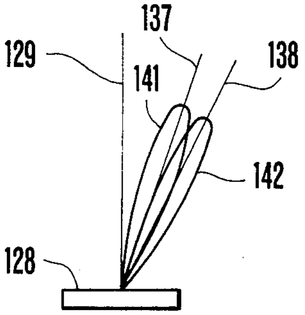
Figure 13C:
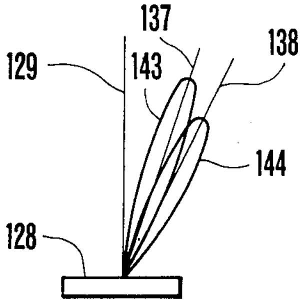

FIGS. 13A, 13B and 13C show the manner of local beam scanning effected by adjusting the set angle $\delta_1$ of the transmission line 103 of the array unit for adjusting the difference between two azimuth angles 137 and 138 of the two radiation beams such that it approximates beam width, and by adjusting the difference $(\phi_1-\phi_2)$ such that the levels of the two beams are continuously varied within a predetermined range so as to effect the local beam scanning with a radiation beam formed by synthesizing two radiation beams. In FIG. 13A, since the level of the radiation beam 140 is higher than that of the radiation beam 139, a beam, not shown, obtained by synthesizing the two beams is directed near the azimuth angle 138. In the case shown in FIG. 13B, since the levels of the two beams are equal, the synthesized beam is directed to the center between azimuth angles 137 and 138, whereas in the case of FIG. 13C the synthesized beam is directed close to the azimuth angle 137.

In the foregoing, switching of beams, settings of radiation power ratios of respective beams to any desired values and the beam scanning of two radiation beams in the horizontal radiation plane have been described. The beam scanning in the vertical radiation plane is performed in the following manner. As described above, the sum $\Sigma\phi=\phi_1+\phi_2$ of the variable power phase shifters 115-1 to 115-6 is related to the phase of the output signal. While maintaining $\Delta\phi=\phi_1-\phi_2$ at a constant value, the phase angles corresponding to $(\phi_1+\phi_2)$ should be set in such a manner that the phase angles of adjacent element are different by $\Delta\phi$ according to the phase-scan principle for the desired beam direction. To this end, for example, when phase values of the two phase shifters in a variable power phase shifter associated with a certain element are $\phi_1$ and $\phi_2$, tbhose values in an adjacent element are to be $\phi_1+\Delta\phi$ and $\phi_2+\Delta\phi$.

Thus, in this embodiment, 6 sets of the horizontal array units 114 forming the two radiation beams and the corresponding variable power phase shifters 115 are arranged in the vertical direction along the vertical feed circuit 116 to form an antenna radiation unit. With this arrangement, by adjusting the phase angles of the variable power phase shifters 115-1 to 115-6, control of the radiation beams in the horizontal radiation plane can be effected, including the switching of two radiation beams and the setting of the power ratio of the two radiation beams to any value as well as the local scanning of a beam formed by overlapping the two radiation beams. Furthermore, with regard to the vertical radiation plane, radiation beam control, including the beam scanning effected by the phase control for the two radiation beams can be used. Of course, the electronically scanned antenna of this invention can be formed by using the vertical and horizontal planes as the first and second radiation planes. In this case, with regard to the vertical radiation plane, radiation beam control can be effected, including the switching of the two radiation beams and setting of the power ratio of the two radiation beams, to any value as well as the local scanning of a beam formed by overlapping the two radiation beams. Further, with regard to the horizontal radiation plane, radiation beam control, including the beam scanning effected by controlling the phase of the two radiation beams, can be made.

Figure 11A:
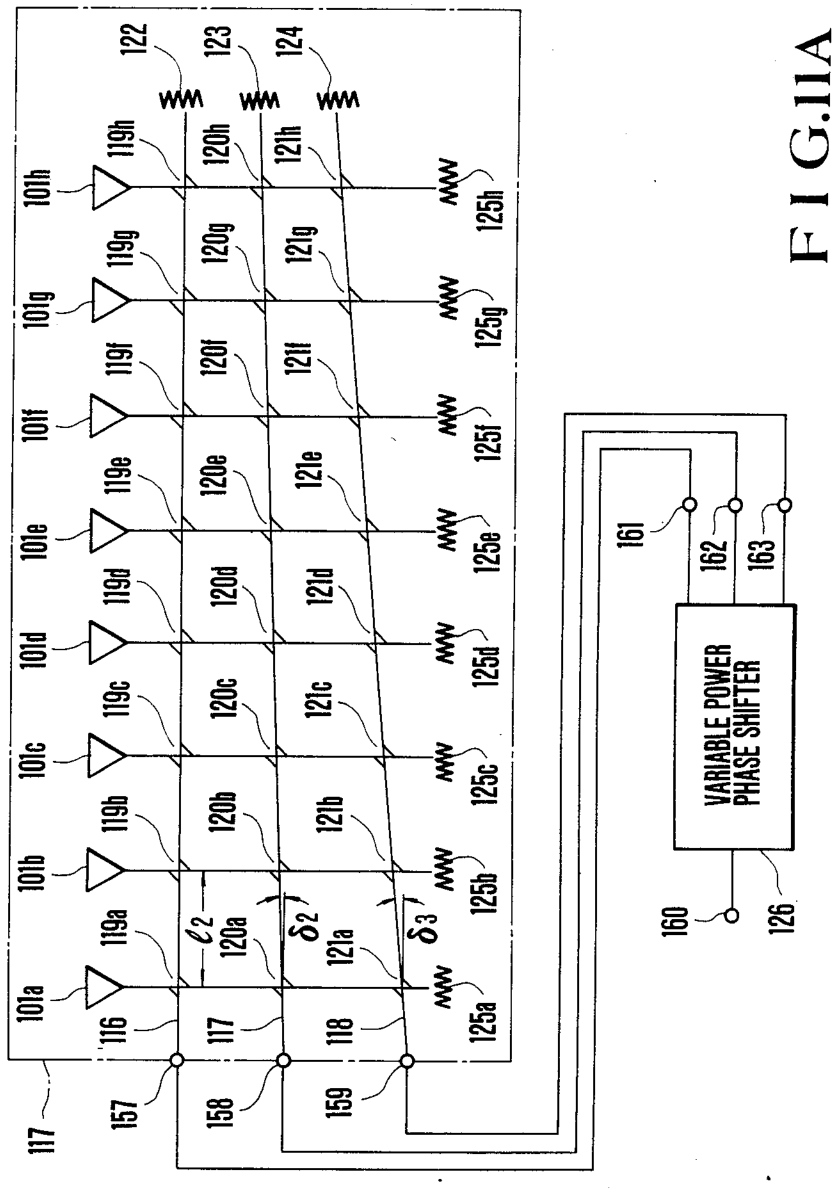
Figure 11B:
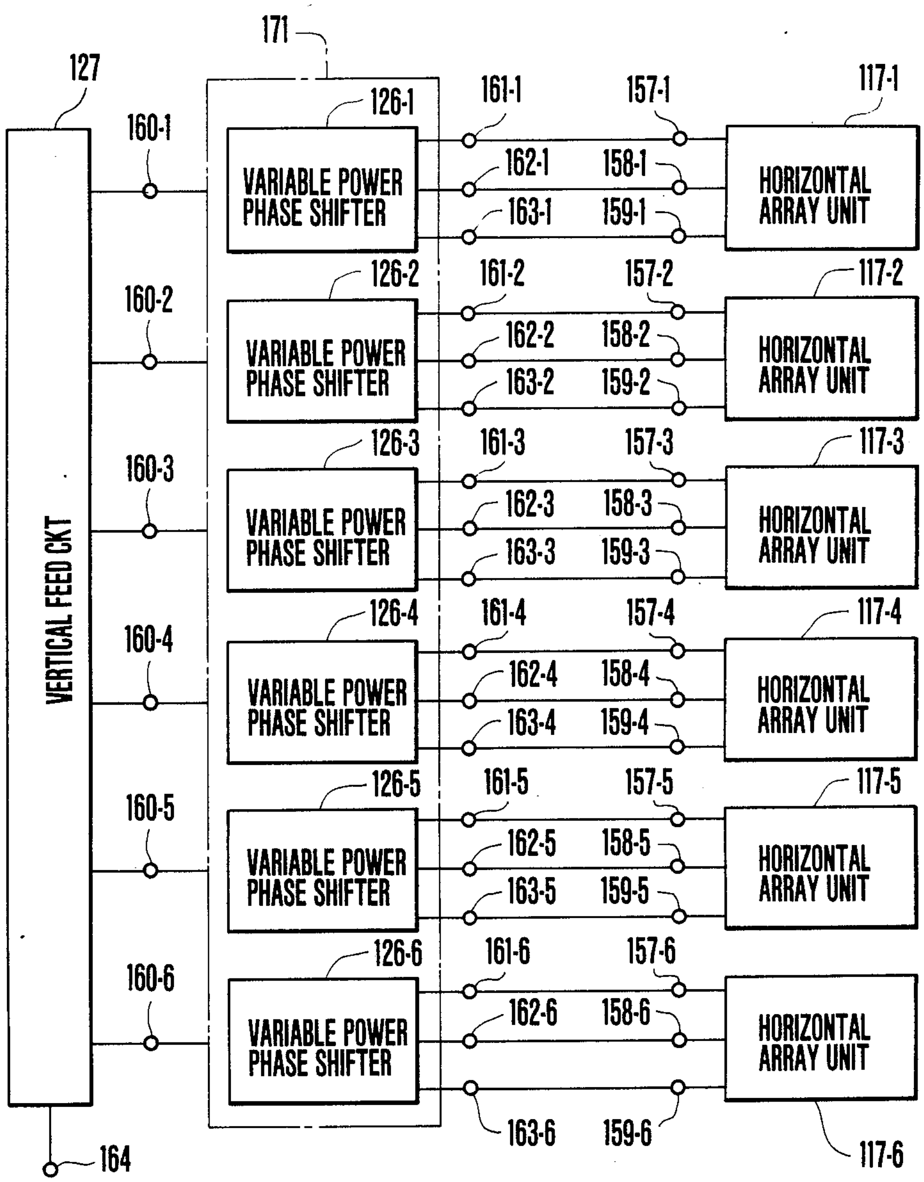

FIGS. 11A and 11B show still another embodiment of this invention in which the horizontal and vertical planes are used as the first and second radiation planes respectively and 3 radiation beams are formed. FIG. 11A is a block diagram adapted to explain the radiation beam characteristics, showing a horizontal array unit, and a three-output variable power phase shifter. In this embodiment, 3 radiation beams are formed in the horizontal radiation plane wherein a radiation aperture of an array antenna is formed by arraying in the vertical direction 6 horizontal array units each including 8 radiation elements arrayed in the horizontal plane. Thus, as shown in FIG. 11B, this embodiment comprises horizontal array units 117-1 to 117-6, beam control means 171 including three-output variable power phase shifters 126-1 to 126-6, and a vertical feed circuit 127.

In FIG. 11A, three transmission lines 116, 117 and 118 are coupled with transmission lines directly connected to radiation elements 101*a* through 101*h* respectively through directional couplers 119*a* to 119*h*, 120*a* to 120*h* and 121*a* to 121*h*. The transmission line 116 is disposed at right angles with respect to the transmission lines directly connected to the respective radiation elements 101*a* to 101*h*, while transmission lines 117 and 118 are disposed at angles $\delta_2$ and $\delta_3$ radians from the orthogonal position, respectively. In the same manner as the horizontal array units shown in FIG. 10A, the power fed to terminals 157, 158 and 159 and radiated by radiation elements 101*a* to 101*h* via transmission lines 116, 117 and 118 produces three multiple beams corresponding to the set values of $\delta_2$ and $\delta_3$. The three-output variable power shifter 126 has the same construction as that shown in FIG. 3B, and by adjusting the phase angles $\phi_1$, $\phi_2$, $\phi_1'$, $\phi_2'$ of the phase shifters included in respective variable power phase shifters, the signals inputted to a terminal 160 is distributed among three terminals 161, 162 and 163 to produce three outputs. In the horizontal radiation plane, by controlling the amplitudes or phases of these 3 outputs, radiation beam control can be achieved, including the switching of the beams, setting of power ratios of respective beams, and beam scanning. In the vertical radiation plane, control of the radiation beams can be effected, including the scannings of the three beams formed in the horizontal radiation plane.

FIG. 11B is a block diagram showing the embodiment shown in FIG. 11A, in which the horizontal array units 117-1 to 117-6 are respectively connected to corresponding three-output variable power phase shifters 126-1 to 126-6 which are coupled to the vertical feed circuit 127. A signal inputted to terminal 164 is divided into 6 signals having predetermined amplitudes and phases by the vertical feed circuit 127, and the 6 signals are applied to three-output variable power phase shifters 126-1 to 126-6. The manner of controlling the 3 multiple beams with the three-output variable power phase shifters 126-1 to 126-6 and horizontal array units 117-1 to 117-6 can readily be understood from the foregoing description regarding FIG. 11A. The basic principle of this modification is the same as that of the embodiment shown in FIGS. 10A and 10B. Of course, in the embodiment shown in FIG. 11B, the vertical and horizontal planes can also be used as the first and second radiation planes.

Figure 14:
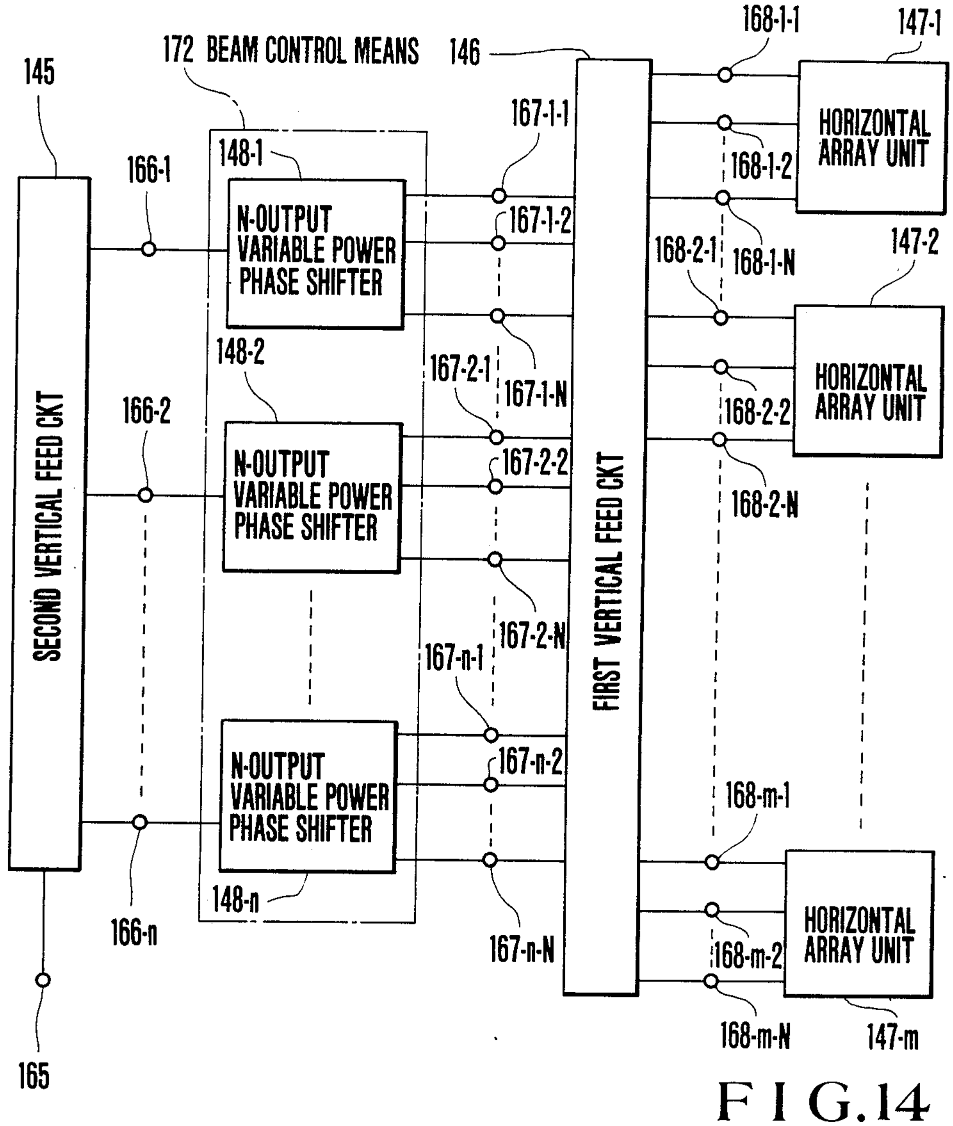
FIG. 14 is a block diagram showing yet another embodiment of this invention.

FIG. 14 shows still another embodiment of this invention, in which the horizontal and vertical planes are used as the first and second radiation planes, respectively. In this case, the horizontal array units form N multiple radiation beams. Thus, $m(m>1)$ horizontal array units 147-1 to 147-m are arrayed in the vertical direction, and feed terminals 168-1-1 to 168-m-N for respective array units are coupled to the vertically arrayed output terminals of a first vertical feed circuit 146. The feed circuit 146 is coupled with beam control means 172 including n $(m>n>1)$ N-output variable power phase shifters 148-1 to 148-n via terminals 167-1-1 to 167-1-N, 167-2-1 to 167-2-N . . . 167-n-1 to 167-n-N. The N-output variable power phase shifters 148-1 to 148-n are connected to the vertical feed circuit 145 via terminals 166-1 to 166-n. In the same manner as in the foregoing embodiments, the signal inputted to a terminal 165 is applied through a second vertical feed circuit 145 to the beam control means 172 including n N-output variable power phase shifters 148-1 to 148-n at predetermined amplitude distribution and phase distribution so as to be applied to the second vertical feed circuit 146 in the form of n-set signals. The feed circuit 146 is constituted by a power branching circuit including such circuit elements as hybrid circuits and directional couplers so as to convert the n-set input signals into m(m>n)-set output signals which are supplied to m horizontal array units 147-1 to 147-m. Where the signals flow in this manner, by controlling the amounts of phase shifts of respective variable phase shifters of the N-output variable power phase shifters 148-1 to 148-n, the N multiple radiation beams radiated from the horizontal array units 147-1 to 147-m are controlled in the horizontal and vertical radiation planes. In this embodiment, the feed circuit 146 includes input and output terminals arrayed in the vertical direction, and m(m>n) horizontal array units 147-1 to 147-m are made to correspond to n N-output variable power phase shifters 148-1 to 148-n so as to reduce the number (n) of N-output variable power phase shifters 148-1 to 148-n employed for controlling the radiation beams as compared to the number (m) of the horizontal array units. Although in this embodiment, multi-beam antennas utilizing the transmission line type array feed system shown in FIG. 10A and FIG. 11A are used as horizontal array units, it should be understood that the invention is not limited to the use of the transmission line type multi-beam antennas to the horizontal array unit and that any multi-beam antennas such as Rotman lens type antennas, and array antennas of the Bathler matrix type can be used as the horizontal array unit. It is also possible to use a multi-beam antenna having a monopulse radiation characteristic as the horizontal array unit. In the embodiment shown in FIG. 14, the first and second radiation planes are respectively constituted by the horizontal and vertical planes but the electronically scanned antenna of this invention can also be formed when the first and second radiation planes are made to respectively correspond to the vertical and horizontal planes.

Still another embodiment will be described as follows. In this case, the antenna radiation unit for forming the two radiation beams of the foregoing embodiment is rotated in the horizontal plane. As shown in FIG. 12A, when the antenna beam is scanned and a target is found by utilizing two radiation beams 132 and 133 having the same level and by scanning a space with a radiation beam rotated in the horizontal plane of the radiation aperture 128, the pulse signals reflected from the target can be received by respective radiation beams so that the acquisition percentage of data is greater than in a case in which a single radiation beam is used. However, because of the use of the two radiation beams, there arises measurement ambiguity of the target azimuth angle. A countermeasure for this problem will be described by discussing ambiguity in azimuth measurement when a plurality of antenna beams are formed simultaneously in an electromagnetic wave apparatus with a rotary antenna with reference to FIGS. 15 to 18.

Figure 15:
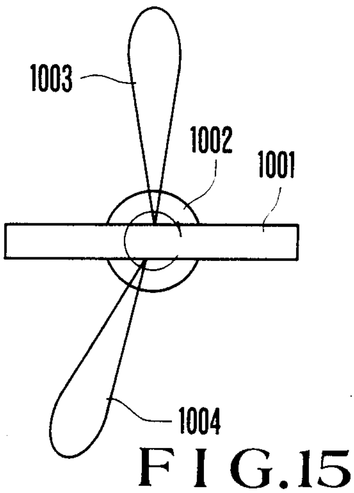
FIG. 15 is a plan view of an antenna forming a plurality of beams in an electromagnetic wave detection system according to this invention.

FIG. 15 shows a plan view of a radiation pattern of a plurality of (two in the example) radiation beams formed wherein reference numeral 1001 denotes a radiation unit of an antenna, 1002 a rotary pedestal rotatable in a direction shown by an arrow, and 1003 and 1004 denote two beams simultaneously formed by respective apertures of the antenna. The example indicates that the two simultaneous beams 1003 and 1004 are asymmetrical in relation to the radiation center and the intervals therebetween are unequal.

Figure 16:
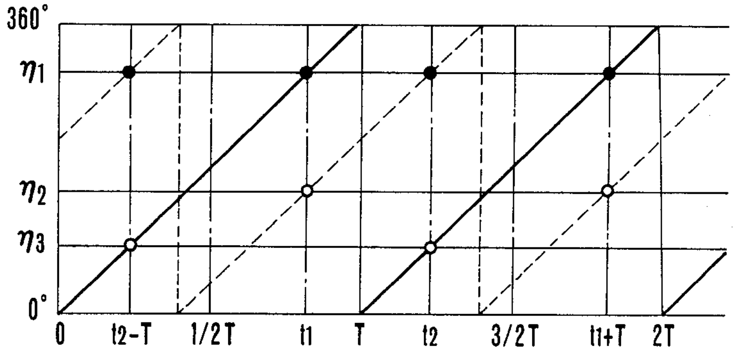
FIG. 16 is a graph showing the relationship between the time and the azimuth angles of beams.
Figure 17:
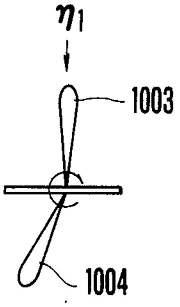
FIGS. 17 and 18 are plan views showing relative positions at times $t_1$ and $t_2$ between beams and the direction of a target.
Figure 18:
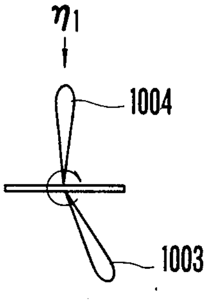

FIG. 16 shows the relationship between the time and the directions of the two major beams as the antenna rotates in a horizontal radiation plane at a constant speed, wherein the abscissa represents time, the reference character T denotes the period of the mechanical rotation of the antenna and the ordinate represents azimuth angles of the beams radiated by the antenna. In FIG. 16, the solid curve corresponds to azimuth angles of the radiation beam 1003, and the dotted curve corresponds to azimuth angles of the radiation beam 1004. At times $t_1$ and $t_2$, the radar obtains target data from a target which lies in an azimuth of $\eta_1$. FIGS. 17 and 18 show the positions of the radiation beams in relation to the target at the times $t_1$ and $t_2$.

Supposing now that the target is located in the direction $\eta_1$, the target is detected by the beam 1003 at the time $t_1$ shown in FIG. 16. The relations between the azimuth $\eta_1$ of the target and the two beams 1003 and 1004 at this time are as shown in FIG. 17. Then the target located in the direction $\eta_1$ is detected by the beam 1004 at the time $t_2$ as the antenna rotates. The relations between the target and the beams 1003 and 1004 at the time $t_2$ are as shown in FIG. 18. When the target is detected by the radar at the time, $t_1$, the azimuth of the target can be measured as either $\eta_1$ or $\eta_2$ in FIG. 16 and is ambiguous. When the target is detected subsequently at the time $t_2$, the azimuth of the target can be either $\eta_1$ or $\eta_3$ in FIG. 16, but the data still does not suffice for determining the azimuth of the target. As the azimuth values of the target at the times $t_1$ and $t_2$ are correlated, however, the directional values $\eta_1$ coincide with each other but the directional values $\eta_2$ and $\eta_3$ do not and the direction of the target can, therefore, be determined as $\eta_1$.

In the case of the preferred embodiment described above for use in a radar, when there are a number of targets the target range is limited in order to minimize the possibility of erroneously determining targets. In this way the efficiency of determining the correct azimuths of targets can be increased.

Further, when the number of beams formed is made three or more, improvement in data acquisition rate can also be expected and the determination of the azimuth of a target can be facilitated.

Similar operations and effects, as in the case of a radar, become available by detecting a plurality of beams in a passive receiving apparatus dedicated to reception used as an electromagnetic wave detection apparatus. In case a number of targets are involved, a range limitation cannot be set, but a limitation in terms of frequency is feasible, so that the efficiency in determining the azimuths of targets can be increased.

As has been explained above, this embodiment has the effects of increasing the target data acquisition rate while retaining the revolution of the antenna, by forming a plurality of beams simultaneously, and of determining the azimuth of a target by making the intervals between azimuth angles of the beams unequal.

Where a radiation beam is formed in either one of the directions 130 and 131 as shown in FIG. 12C, as the radiation aperture 128 is rotated in the horizontal direction, the radiation beams 136 and 136' are alternately switched in synchronism with the rotation in the horizontal plane of the antenna pedestal. This improves the acquisition rate of the target data in the same manner as in the case of using two radiation beams while efficiently utilizing the antenna aperture efficiency of the radiation aperture unit 128. Moreover, it is not necessary to mount two array antennas on the rotating pedestal as in the prior art and to provide a high power circuit transfer switch. In the foregoing embodiments, the beam control means comprises a plurality of variable power phase shifters each having one input terminal and N output terminals corresponding to N multi-radiation beams, but a phase shifter may be connected to each of the input terminals of the respective antenna array units. In this modification, the respective phase shifters included in a phase shifter group corresponding to the respective N multi-radiation beams have the input terminal connected to the output terminal of a single feed circuit or of a plurality of separate feed circuits which feed power to provide a predetermined aperture distribution to the antenna array units. Variable power distributors corresponding in number to the separate feed circuits are connected to the input terminals of the feed circuits. Thus, according to this invention, various radiation beam controls, including switching of N multi-radiation beams, setting to any value the ratios of respective radiation beam powers and radiation beam scanning can be made with a relatively small number of multi-output variable power phase shifters where the antenna is mounted on a rotating pedestal. In addition, a plurality of array antennas can be reduced to one and the high power circuit transfer device can be eliminated.

As described above, according to this invention, it is possible to greatly reduce number of the component elements such as phase shifters necessary to form beams having desired radiation beam characteristics. Moreover, where the radiation aperture is rotated in the horizontal plane, the number of array antenna can be reduced to one and the high power circuit transfer device can be eliminated, whereby the construction of antenna can be simplified and its reliability can be improved.

Although the present invention has been described in connection with a plurality of preferred embodiments thereof, many other variations and modifications will now become apparent to those skilled in th art. It is preferred, therefore, that the present invention be limited not by the specific disclosure herein, but only by the appended claims.

What is claimed is:

1. An electronically scanned antenna comprising N independent radiation aperture units adapted to form N radiation beams in a first radiation plane, where $N>1$, and a plurality of beam control means having a power variable distribution performance and a phase control performance, each said control means comprising a power distributor equally distributing an input signal, a pair of electronically variable phase shifters connected to respective output terminals of said power distributor, and a 90° hybrid coupler inputted with a pair of output signals of said electronically variable phase shifters, said pair of electronically variable phase shifters being responsive to respective external control signals for switching of the radiation beams and setting of radiation power ratio for the respective radiation beams to any desired values in said first radiation plane regarding said N radiation beams and radiation beam scanning in a second radiation plane orthogonal to said first radiation plane in a predetermined reference direction with reference to said first radiation plane in which said N radiation beams are formed.

2. An electronically scanned antenna comprising $N(N>1)$ independent radiation aperture units for forming N radiation beams in a first radiation plane, wherein radiation elements of the radiation aperture units corresponding to respective ones of said N radiation beams are arrayed alternately so as to commonly use substantially the same radiation aperture plane, and a plurality of beam control means having a power variable distribution performance and a phase control performance, said control means comprising a power distributor equally distributing an input signal, a pair of electronically variable phase shifters connected to respective output terminals of said power distributor, and a 90° hybrid coupler inputted with a pair of output signals of said electronically variable phase shifters, said pair of electronically variable phase shifters being responsive to respective external control signals for switching of the radiation beams, setting of radiation power ratio for the respective radiation beams to any desired values and radiation beam scanning in the case of forming the radiation beams in the overlapping manner in said first radiation plane regarding said N radiation beams and radiation beam scanning in a second radiation plane orthogonal to said first radiation plane in which said N radiation beams are formed in a predetermined reference direction.

3. The electronically scanned antenna according to claim 1 wherein said radiation aperture units are rotated in a horizontal plane.

4. Th electronically scanned antenna according to claim 1 wherein said first and second radiation planes correspond to a horizontal radiation plane and a vertical radiation plane respectively, each of said N independent radiation aperture units forming said N beams is so constructed as to have M $(M>1)$ input terminals formed by a vertical array of radiation elements, N input terminals at the same position of M sets of N independent radiation units are connected to respective N-output terminals of M beam control means, input terminals of said M beam control means are connected to a vertical feed circuit having M output terminals, and power is supplied to said M beam control means through said vertical feed circuit.

5. The electronically scanned antenna according to claim 1, wherein said first and second radiation planes correspond to a vertical radiation plane and a horizontal radiation plane respectively, each of said N independent radiation aperture units forming said N beams is so constructed as to have M $(M>1)$ input terminals formed by a horizontal array of radiation elements, N input terminals at the same position of M sets of N independent radiation units are connected to respective N-output terminals of said M beam control means, input terminals of said M beam control means are connected to a horizontal feed circuit having M output terminals, and power is supplied to said M beam control means through said horizontal feed circuit.

6. The electronically scanned antenna according to claim 1 wherein $(N-1)$ two-output variable power phase shifters each having a pair of output terminals are connected in series and parallel corresponding to said N radiation beams thereby forming N output terminals corresponding to one input terminal.

7. An electronically scanned antenna comprising a radiation aperture unit forming N(N > 1) multi-radiation beams in a first radiation plane, and beam control means having variable power distribution performance and a phase control performance, said beam control means comprising a power distributor equally distributing an input signal, a pair of electronically variable phase shifters connected to respective output terminals of said power distributor, and a 90° hybrid coupler inputted with a pair of output signals of said electronically variable phase shifters, said pair of electronically variable phase shifters being responsive to respective external control signals for switching of the radiation beams, setting of radiation power ratio for the respective radiation beams to any desired values and radiation beam scanning in the case of forming the radiation beams in the overlapping manner in said first radiation plane in which said multi-radiation beams are formed and radiation beam scanning in a second radiation plane orthogonal to said first radiation plane in which said multi-radiation beams are formed in a predetermined reference direction.

8. The electronically scanned antenna according to claim 7 wherein said radiation aperture unit is rotated in a horizontal plane.

9. The electronically scanned antenna according to claim 7 wherein said first and second radiation planes correspond to a horizontal radiation plane and a vertical radiation plane respectively, said radiation aperture unit forming said N multi-radiation beam is formed by arraying in the vertical direction M (M > 1) horizontal array units, each including a plurality of horizontally arrayed radiation elements, respective input terminals of said M horizontal array units are connected to the output terminals of said M control means, and a vertical feed circuit having M output terminals is connected to respective input terminals of said M beam control means for feeding power thereto.

10. The electronically scanned antenna according to claim 7 wherein said first and second radiation planes correspond to a vertical radiation plane and a horizontal radiation plane respectively, said radiation aperture unit forming said N multi-radiation beam is formed by arraying in the horizontal direction M(M > 1) vertical array units each including a plurality of radiation elements arrayed in the vertical direction, respective input terminals of said M vertical array units are respectively connected to output terminals of said M beam control means, and a horizontal feed circuit having M output terminals is connected to respective input terminals of said M beam control means for feeding powder to thereto.

11. The electronically scanned antenna according to claim 7, wherein (N − 1) two-output variable power phase shifters each having a pair of output terminals are connected in series and parallel corresponding to said N multi-beams so as to form N output terminals corresponding to one input terminal.

12. An electromagnetic wave apparatus comprising an antenna which is mechanically rotatable in a horizontal plane and has a radiation unit for simultaneous formation of a plurality of beams in azimuth directions and a receiver for reception of the beams, wherein the plurality of beams are formed in such a way that the simultaneous beams are asymmetrical in relation to the radiation center and the intervals therebetween are unequal, and target data received at unequal time intervals corresponding to said plurality of beams are processed in terms of azimuth angle correlation to determine the azimuth of said target.

13. The electronically scanned antenna according to claim 8, wherein the plurality of beams are formed in such a way that the simultaneous beams are asymmetrical in relation to the radiation center and the intervals therebetween are unequal, and target data received at unequal time intervals corresponding to said plurality of beams are processed in terms of azimuth angle correlation to determine the azimuth of said target.

14. The electronically scanned antenna according to claim 2 wherein said radiation aperture units are rotated in a horizontal plane.

15. The electronically scanned antenna according to claim 2 wherein said first and second radiation planes correspond to a horizontal radiation plane and a vertical radiation plane respectively, each of said N independent radiation aperture units forming said N beams is so constructed as to have M(M > 1) input terminals formed by a vertical array of radiation elements, N input terminals at the same position of M sets of N independent radiation units are connected to respective N-output terminals of M beam control means, input terminals of said M beam control means are connected to a vertical feed circuit having M output terminals, and power is supplied to said M beam control means through said vertical feed circuit.

16. The electronically scanned antenna according to claim 3 wherein said first and second radiation planes correspond to a horizontal radiation plane and a vertical radiation plane respectively, each of said N independent radiation aperture units forming said N beams is so constructed as to have M(M > 1) input terminals formed by a vertical array of radiation elements, N input terminals at the same position of M sets of N independent radiation units are connected to respective N-output terminals of M beam control means, input terminals of said M beam control means are connected to a vertical feed circuit having M output terminals, and power is supplied to said M beam control means through said vertical feed circuit.

17. The electronically scanned antenna according to claim 2 wherein said first and second radiation planes correspond to a vertical radiation plane and a horizontal radiation plane respectively, each of said N independent radiation aperture units forming said N beams is so constructed as to have M(M > 1) input terminals formed by a horizontal array of radiation elements, N input terminals at the same position of M sets of N independent radiation units are connected to respective N-output terminals of said M beam control means, input terminals of said M beam control means are connected to a horizontal feed circuit having M output terminals, and power is supplied to said M beam control means through said horizontal feed circuit.

18. The electronically scanned antenna according to claim 3 wherein said first and second radiation planes correspond to a vertical radiation plane and a horizontal radiation aperture units forming said N beams is so constructed as to have M(M > 1) input terminals formed by a horizontal array of radiation elements, N input terminals at the same position of M sets of N independent radiation units are connected to respective N-output terminals of said M beam control means are connected to a horizontal feed circuit having M output terminals, and power is supplied to said M beam control means through said horizontal feed circuit.

19. The electronically scanned antenna according to claim 2, wherein (N−1) two-output variable power phase shifters each having a pair of output terminals are connected in series and parallel corresponding to said N radiation beams thereby forming N output terminals corresponding to one input terminal.

20. The electronically scanned antenna according to claim 3, wherein (N−1) two-output variable power phase shifters each having a pair of output terminals are connected in series and parallel corresponding to said N radiation beams thereby forming N output terminals corresponding to one input terminal.

21. The electronically scanned antenna according to claim 4, wherein (N−1) two-output variable power phase shifters each having a pair of output terminals are connected in series and parallel corresponding to said N radiation beams thereby forming N output terminals corresponding to one input terminal.

22. The electronically scanned antenna according to claim 5, wherein (N−1) two-output variable power phase shifters each having a pair of output terminals are connected in series and parallel corresponding to said N radiation beams thereby forming N output terminals corresponding to one input terminal.

23. The electronically scanned antenna according to claim 8 wherein said first and second radiation planes correspond to a horizontal radiation plane and a vertical radiation plane respectively, said radiation aperture unit forming said N multi-radiation beam is formed by arraying in the vertical direction M(M>1) horizontal array units, each including a plurality of horizontally arrayed radiation elements, respective input terminals of said M horizontal array units are connected to the output terminals of said M control means, and a vertical feed circuit having M output terminals is connected to respective input terminals of said M beam control means for feeding power thereto.

24. The electronically scanned antenna according to claim 8 wherein said first and second radiation planes correspond to a vertical radiation plane and a horizontal radiation plane respectively, said radiation aperture unit forming said N multi-radiation beam is formed by arraying in the horizontal direction M(M>1) vertical array units each including a plurality of radiation elements arrayed in the vertical direction, respective input terminals of said M vertical array units are respectively connected to output terminals of said M beam control means, and a horizontal feed circuit having M output terminals is connected to respective input terminals of said M beam control means for feeding power thereto.

25. The electronically scanned antenna according to claim 8, wherein (N−1) two-output variable power phase shifters each having a pair of output terminals are connected in series and parallel corresponding to said N radiation beams thereby forming N output terminals corresponding to one input terminal.

26. The electronically scanned antenna according to claim 9, wherein (N−1) two-output variable power phase shifters each having a pair of output terminals are connected in series and parallel corresponding to said N radiation beams thereby forming N output terminals corresponding to one input terminal.

27. The electronically scanned antenna according to claim 10, wherein (N−1) two-output variable power phase shifters each having a pair of output terminals are connected in series and parallel corresponding to said N radiation beams thereby forming N output terminals corresponding to one input terminal.

28. The electronically scanned antenna according to claim 9, wherein the plurality of beams are formed in such a way that the simultaneous beams are asymmetrical in relation to the radiation center and the intervals therebetween are unequal, and target data received at unequal time intervals corresponding to said plurality of beams are processed in terms of azimuth angle correlation to determine the azimuth of said target.

29. The electronically scanned antenna according to claim 3, wherein the plurality of beams are formed in such a way that the simultaneous beams are asymmetrical in relation to the radiation center and the intervals therebetween are unequal, and target data received at unequal time intervals corresponding to said plurality of beams are processed in terms of azimuth angle correlation to determine the azimuth of said target.

30. The electronically scanned antenna according to claim 4, wherein the plurality of beams are formed in such a way that the simultaneous beams are asymmetrical in relation to the radiation center and the intervals therebetween are unequal, and target data received at unequal time intervals corresponding to said plurality of beams are processed in terms of azimuth angle correlation to determine the azimuth of said target.

31. An electromagnetic wave apparatus comprising:

an antenna which is mechanically rotatable in a horizontal plane and has a single power feed terminal and a radiation unit, being fed with power from said single power feed terminal, for simultaneous formation of a plurality of beams in azimuth directions such that the simultaneously occurring beams are asymmetrical in relation to the radiation center with a major angle and a minor angle formed between the simultaneous beams, said radiation unit also functioning complimentarily to receive the beams and produce output signals;

receiver means for reception of the output signals from said antenna; and processing means for processing output signals from said receiver, said processing means examining the presence or absence of a target in all candidate azimuth directions each time that the respective beams are directed toward the respective candidate azimuth directions and determining, as an azimuth of targets, an azimuth which is identical in each examination.

32. An electronically scanned antenna comprising N independent radiation aperture units adapted to form N radiation beams in a first radiation plane, where N>1, and a plurality of beam control means having a power variable distribution performance and a phase control performance, said control means comprising a power distributor equally distributing an input signal, a pair of electronically variable phase shifters connected to respective output terminals of said power distributor, and a 90° hybrid coupler inputted with a pair of output signals of said electronically variable phase shifters, said pair of electronically variable phase shifters being responsive to respective external control signals for switching of the radiation beams and setting of radiation power ratio for the respective radiation beams to any desired values in said first radiation plane regarding said N radiation beams and radiation beam scanning in a second radiation plane orthogonal to said first radiation plane in a predetermined reference direction with reference to said first radiation plane in which said N radiation beams are formed; said antenna being mechanically rotatable in a horizontal plane and having a single power feed terminal and a radiation unit, being fed with power from said single power feed terminal, for simultaneous formation of a plurality of beams in azimuth directions such that the simultaneously occurring beams are asymmetrical in relation to the radiation center with a major angle and a minor angle formed between the simultaneous beams, said radiation unit also functioning complementarily to receive the beams and produce output signals; said antenna further comprising receiver means for reception of the output signals from said antenna; and processing means for processing output signals from said receiver, said processing means examining the presence or absence of a target in all candidate azimuth directions each time that the respective beams are directed toward the respective candidate azimuth directions and determining, as an azimuth of the targer, an azimuth which is identical in each examination.

33. An electronically scanned antenna comprising a radiation aperture unit forming N(N>1) multi-radiation beams in a first radiation plane, and beam control means having variable power distribution performance and a phase control performance, said beam control means comprising a power distributor equally distributing an input signal, a pair of electronically variable phase shifters connected to respective output terminals of said power distributor, and a 90° hybrid coupler inputted with a pair of output signals of said electronically variable phase shifters, said pair of electronically variable phase shifters being responsive to respective external control signals for switching of the radiation beams, setting of radiation power ratio for the respective radiation beams to any desired values and radiation beam scanning in the case of forming the radiation beams in the overlapping manner in said first radiation plane in which said multi-radiation beams are formed and radiation beam scanning in a second radiation plane orthogonal to said first radiation plane in which said multi-radiation beams are formed in a predetermined reference direction; said antenna being mechanically rotatable in a horizontal plane and having a single power feed terminal and a radiation unit, being fed with power from said single power feed terminal, for simultaneous formation of a plurality of beams in azimuth directions such that the simultaneously occurring beams are asymmetrical in relation to the radiation center with a major angle and a minor angle formed between the simultaneous beams, said radiation unit also functioning complementarily to receive the beams and produce output signals; said antenna further comprising receiver means for reception of the output signals from said antenna; and processing means for processing output signals from said receiver, said processing means examining the presence or absence of a target in all candidate azimuth directions each time that the respective beams are directed toward the respective candidate azimuth directions and determining, as an azimuth of the target, an azimuth which is identical in each examination.

* * * * *